(12) United States Patent
Desikan

(10) Patent No.: US 8,005,716 B1
(45) Date of Patent: Aug. 23, 2011

(54) METHODS AND SYSTEMS FOR ESTABLISHING A KEYWORD UTILIZING PATH NAVIGATION INFORMATION

(75) Inventor: Pavan Desikan, San Jose, CA (US)

(73) Assignee: Google Inc., Mountain View, CA (US)

( * ) Notice: Subject to any disclaimer, the term of this patent is extended or adjusted under 35 U.S.C. 154(b) by 629 days.

(21) Appl. No.: 10/881,492

(22) Filed: Jun. 30, 2004

(51) Int. Cl.
*G06Q 30/00* (2006.01)
(52) U.S. Cl. ...................... 705/14.54; 707/722
(58) Field of Classification Search ............ 707/1; 705/14.53–54
See application file for complete search history.

(56) References Cited

U.S. PATENT DOCUMENTS

| | | | |
|---|---|---|---|
| 6,006,222 A | 12/1999 | Culliss | |
| 6,014,665 A | 1/2000 | Culliss | |
| 6,078,916 A | 6/2000 | Culliss | |
| 6,182,068 B1 | 1/2001 | Culliss | |
| 6,185,559 B1 | 2/2001 | Brin et al. | |
| 6,285,999 B1 | 9/2001 | Page | |
| 6,526,440 B1 | 2/2003 | Bharat | |
| 6,529,903 B2 | 3/2003 | Smith et al. | |
| 6,615,209 B1 | 9/2003 | Gomes et al. | |
| 6,658,423 B1 | 12/2003 | Pugh et al. | |
| 6,678,681 B1 | 1/2004 | Brin | |
| 6,725,259 B1 | 4/2004 | Bharat | |
| 6,754,873 B1 | 6/2004 | Law et al. | |
| 7,089,194 B1* | 8/2006 | Berstis et al. | 705/14.54 |
| 2002/0042791 A1 | 4/2002 | Smith et al. | |
| 2002/0052913 A1* | 5/2002 | Yamada et al. | 709/202 |
| 2002/0052925 A1* | 5/2002 | Kim et al. | 709/217 |
| 2002/0099605 A1* | 7/2002 | Weitzman et al. | 705/14 |
| 2002/0123912 A1* | 9/2002 | Subramanian et al. | 705/5 |
| 2002/0123988 A1 | 9/2002 | Dean et al. | |
| 2002/0133481 A1 | 9/2002 | Smith et al. | |
| 2004/0059708 A1 | 3/2004 | Dean et al. | |
| 2004/0119740 A1 | 6/2004 | Change et al. | |
| 2004/0122808 A1* | 6/2004 | Martin et al. | 707/3 |
| 2004/0122811 A1 | 6/2004 | Page | |
| 2004/0267723 A1* | 12/2004 | Bharat | 707/3 |
| 2005/0021397 A1* | 1/2005 | Cui et al. | 705/14 |
| 2005/0033771 A1* | 2/2005 | Schmitter et al. | 707/104.1 |
| 2005/0076003 A1* | 4/2005 | DuBose et al. | 707/1 |

OTHER PUBLICATIONS

U.S. Appl. No. 10/726,483.
U.S. Appl. No. 60/507,617.
Brin, Sergey et al., "The Anatomy of a Large-Scale Hypertextual Web Search Engine," 1998, Computer Science Department, Stanford University, Stanford, CA.

* cited by examiner

Primary Examiner — Tim T. Vo
Assistant Examiner — Aaron Sanders
(74) Attorney, Agent, or Firm — Fish & Richardson P.C.

(57) ABSTRACT

Systems and methods for determining and utilizing path navigation information. In one aspect, a method includes determining an article containing at least one item, determining a path associated with the article, and identifying at least one term associated with the at least one item based at least in part on the path.

23 Claims, 5 Drawing Sheets

METHODS AND SYSTEMS FOR ESTABLISHING A KEYWORD UTILIZING PATH NAVIGATION INFORMATION

FIELD OF THE INVENTION

The invention generally relates to selection data. More particularly, the invention relates to methods and systems for determining and utilizing selection data.

BACKGROUND

Documents, such as web pages, can be matched to other items, such as advertisements, on the Internet. For example, a publisher of a website may allow advertising for a fee on its web pages. When the publisher desires to display an advertisement on a web page to a user, a facilitator can provide an advertisement to the publisher to display on the web page. The facilitator can select the advertisement by a variety of factors, such as demographic information about the user, the category of the web page, for example, sports or entertainment, or the content of the web page. The facilitator can also match the content of the web page to a keyword from a list of keywords. An advertisement associated with the matched keyword can then be displayed on the web page. A user may manipulate a mouse or another input device and "click" on the advertisement to view a web page on the advertiser's website that offers goods or services for sale. Advertisers desire that the advertisements displayed on a web site appeal to users viewing the web site so that the number of users selecting of clicking on the advertisement will be high.

Certain publishers create web sites that contain little informational content for the specific purpose of hosting advertisements that will generate revenue for the publisher. The publishers of such web sites sometimes attempt to manipulate the website so that it will appear high in a listing of search results. Such publishers may also purchase less expensive keywords associated with a product and link the advertisement to web pages containing little informational content but many additional advertisements for products associated with more expensive keywords. In this way a publisher can purchase a less expensive keyword but have the benefit of advertising products or services associated with expensive keywords. Users viewing such low informational content pages will frequently select or click on the advertisements on the page in order to move to a more informative web page.

SUMMARY

Embodiments of the present invention comprise systems and methods for determining and utilizing selection data. One aspect of the present invention comprises determining an article containing at least one item associated with selection data, determining a path associated with the article, and identifying at least one term associated with the at least one item based at least in part on the path. Another aspect of the present invention comprises determining a geographical location associated with an article based at least in part on selection data associated with the article, determining geographical locations associated with at least some items within a plurality of items based at least in part on selection data associated with the at least some items, and selecting at least one of the plurality of items to be presented on the article based at least in part on the geographical location associated with the article and the geographical location associated with the item. Another aspect of the present invention comprises determining an article containing at least one item, determining selection data associated with the at least one item, and determining a likelihood that the article is a manipulated article based at least in part on the selection data associated with the at least one item.

These exemplary embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Figure 1:
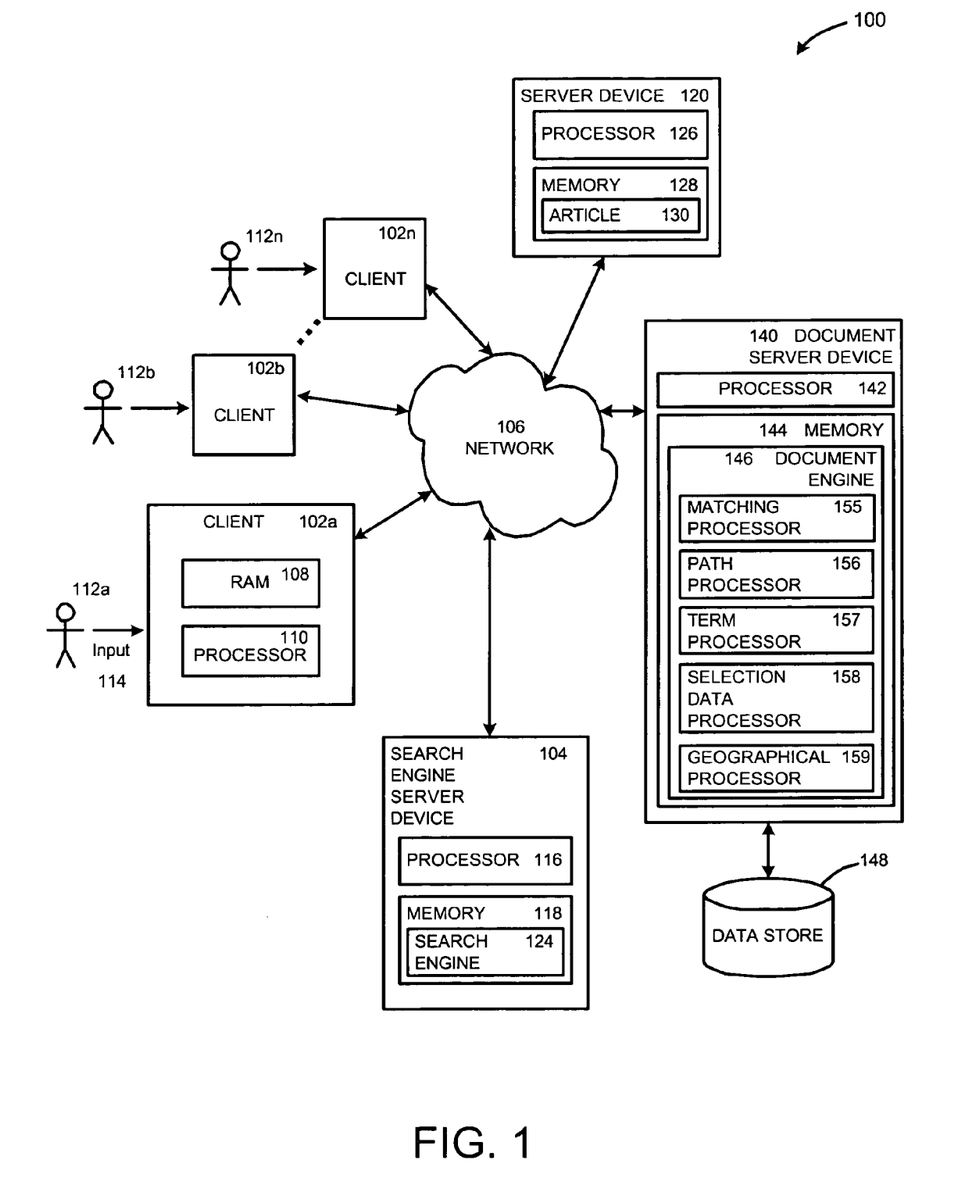
FIG. 1 illustrates a diagram of a system in accordance with one embodiment of the present invention.

The present invention comprises methods and systems for determining and utilizing selection data. Various systems in accordance with the present invention may be constructed. FIG. 1 is a diagram illustrating an exemplary system in which exemplary embodiments of the present invention may operate. The present invention may operate, and be embodied in, other systems as well.

Referring now to the drawings in which like numerals indicate like elements throughout the several figures, FIG. 1 is a diagram illustrating an exemplary environment for implementation of an embodiment of the present invention. The system 100 shown in FIG. 1 comprises multiple client devices 102*a-n* in communication with a search engine server device 104 and a server device 120 over a network 106. Additionally, a document server device 140 is in communication with the network 106. In one embodiment, the network 106 shown comprises the Internet. In other embodiments, other networks, such as an intranet, WAN, or LAN may be used. Moreover, methods according to the present invention may operate within a single computer.

The client devices 102*a-n* shown each comprises a computer-readable medium, such as a random access memory (RAM) 108 coupled to a processor 110. The processor 110 executes computer-executable program instructions stored in memory 108. Such processors may comprise a microprocessor, an ASIC, and state machines. Such processors comprise, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102*a*, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, VISUAL BASIC, JAVA.

Client devices 102a-n may also comprise a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, a client device 102a may be any type of processor-based platform that is connected to a network 106 and that interacts with one or more application programs. Client devices 102a-n may operate on any operating system capable of supporting a browser or browser-enabled application, such as MICROSOFT® WINDOWS® or LINUX. The client devices 102a-n shown include, for example, personal computers executing a browser application program such as MICROSOFT CORPORATION's INTERNET EXPLORER™, NETSCAPE COMMUNICATION CORPORATION's NETSCAPE NAVIGATOR™, and APPLE COMPUTER, INC.'s SAFARI™.

Through the client devices 102a-n, users 112a-n can communicate over the network 106 with each other and with other systems and devices coupled to the network 106. As shown in FIG. 1, a search engine server device 104, a server device 120, and a document server device 140 are also coupled to the network 106. The search engine server device 104 shown in FIG. 1 comprises a processor 116 coupled to a computer-readable memory 118. Memory 118 in the search engine server device 104 shown in FIG. 1 comprises a search engine 124. The search engine 124 can receive search queries from users 112a-n and cause the display of web pages containing search results. The web pages containing search results can further contain advertisements for products or services. Advertisers can bid on advertisements to display on a listing of search results by bidding on keywords associated with a product or service. Keywords comprise words that designate a particular product or service and can associate the product or service with search terms. For example, the keyword "camera" can be used to associate cameras with search terms associated with cameras. In this manner, an advertiser may bid on keywords that will likely generate interest in the advertiser's products or services. The search engine server device 104 can then cause the display of advertisements associated with a list of search results based at least in part on the keywords. For example, if an advertiser wishes to advertise a particular prescription drug, the advertiser could bid on the keyword "prescription." When a user conducts a search containing the keyword "prescription," an advertisement for the advertiser's particular prescription drug can be displayed with the list of search results.

Server device 120 shown in FIG. 1 comprises a processor 126 coupled to a computer readable memory 128. The memory 128 comprises one or more articles 130, such as web pages or a website. The server device 120 can host one or more articles, such as web pages, containing items. Items can comprise advertisements, such as content-based advertisements, links to other web pages, banner advertisements, or any other suitable item contained on an article. The server device 104 can also request an advertisement from the document server device 140 or can contain articles linked from advertisements contained on a listing of search results from the search engine server device 104. The search engine server device 104 and the server device 120, depicted as single computer systems, can be implemented as a network of computers. Examples of a server device 120 or a search engine server device 104 are servers, mainframe computers, networked computers, a processor-based device, and similar types of systems and devices. Client processor 110, server processors 126, and search engine processor 126 can be any of a number of computer processors, such as processors from INTEL CORPORATION of Santa Clara, Calif. and MOTOROLA CORPORATION of Schaumburg, Ill.

The document server device 140 shown comprises a server device executing a document engine application program. The document server device 140 shown comprises a processor 142 coupled to a computer-readable medium 144. The document server device 140 is in communication with a data store 148. Document server device 140, depicted as a single computer system, may be implemented as a network of computers. Memory 144 contains a document engine application program also known as a document engine 146. The document engine 146 is capable of determining articles located on the network 106. Articles can include, for example, web pages, portable document format files, word processor files, audio/video files or any other file or information of any suitable type available on the network 106. According to certain embodiments of the present invention, the document engine 146 can determine articles on the network 106 that have requested advertisements and can further cause advertisements to be displayed on the articles. For example, if a publisher has requested advertisements to be displayed on a web page, for example, the article 130 contained on the server device 120, the document engine 146 can determine an advertisement associated with the article 130 and cause that advertisement to be displayed with the article 130.

The document engine 146 can further determine manipulated articles. Manipulated articles include articles that are designed to rank artificially high in a listing of search results. For example, a manipulated article may contain artificially generated content based on popular query terms and may automatically create links from other articles to the manipulated article. Additionally, manipulated articles may present different articles to a web crawler than to users. Manipulated articles can contain advertisements designed to generate revenue when users select the advertisements. Manipulated articles may further contain content designed to generate content ads associated with the key terms on the web page, but provide no real substantive information. Because manipulated articles contain little information content, users accessing manipulated articles will frequently select an advertisement displayed on the article in order to move to a more useful web page.

The document engine 146 further comprises a matching processor 155, a path processor 156, a term processor 157, a click-through processor 158, and a geographical processor 159. The path processor 156 is capable of determining a path associated with an article reflecting a sequence of articles accessed by the user 112a. For example, the user 112a begin a sequence of articles by visiting a search engine home page hosted by the search engine server device 104 and entering a search request. The search engine 124 can then cause the display of a listing of search results accompanied by advertisements. The user 112a can then select one of the advertisements and be taken to another page, for example, article 130 on server device 120. The article 130, according to some embodiments, may contain a second advertisement generated by the document engine 146. Finally, the user 112a can conclude the sequence of articles by selecting one of these advertisements and be taken to a final web page linked to the second advertisement. In this example, the path processor 156 can determine a path comprising the sequence of web pages accessed by the user is moving from the search engine home page to the final web page linked to the second advertisement. The path can reflect items and articles presented to the user 112a as well as text entered by the user 112a.

The term processor 157 can determine terms associated with an article or with a path determined by the path processor 156. Terms can comprise advertising keywords, text associated with items such as links, advertisements, or banner ads, text within an article such as a web page, embedded text, search terms, or other suitable terms associated with an article. For example, in the example above, the path processor 156 determined a series of web pages accessed by the user 112a in moving from a search engine home page to a final web page. The term processor can determine from this sequence of pages a set of terms reflecting, for example, potential advertising keywords. The term processor can determine terms, for example, based on the text of advertisements contained on a web page, the text of a search query entered by the user 112a, the text of links followed by the user 112a, or other suitable terms otherwise associated with the path determined by the path processor 156.

The selection data processor 158 is capable of determining selection data, such as click-through data, associated with items within an article. Click-through data can reflect, for example, a number of times an item, such as an advertisement, was selected by the user 112a. Additionally, click-through data can reflect a number of times an advertisement was selected as a percentage of a number of times the advertisement was viewed as part of the Article 130. The selection data processor 158 can use the click-through data to determine average click-through rates and other behaviors associated with articles and advertisements. For example, the selection data processor 158 can compare click-through data for multiple articles and can determine arithmetic mean, standard deviation, variance, range of values, or other suitable properties of the click-through data for the articles to assist in determining the effectiveness of ads and associated articles. Other types of selection data can include how frequently the user 112a purchases an item advertised by an advertisement or any other suitable information relating to selecting an item within an article. The selection data processor 158 can communicate with the data store 148 regarding selection data associated with an item. For example, the selection data processor 158 can send selection data to the data store 148 in association with an item or receive from the data store 148 stored selection data associated with an item.

The geographical processor 159 can determine a geographical location associated with an article, with an item contained in the article, or with a user. The geographical processor 159 can determine a geographical location associated with an article or item, for example, by determining an IP address associated with a user accessing the article or item. For example, if a web page is accessed primarily by users with IP addresses located in California, the geographical processor can associate the geographical location California with the web page. Similarly, if an advertisement is selected primarily by users associated with IP addresses in California, the geographical processor 159 can associated the geographical location California with the advertisement. The geographical location associated with a user can reflect the geographical location associated with the user's IP address.

The matching processor 155 can determine a match between an item, such as an advertisement, and an article, such as a web page requesting an advertisement. For example, if a publisher requests advertisements to be displayed on a web page, for example article 130 in FIG. 1, the document engine 146 can determine that the article 130 has requested an advertisement and send this information to the matching processor 155. The matching processor 155 can then select an advertisement determined by one or more selection criteria to be most likely to be selected by a user viewing the web page. For example, if the article 130 is a web page discussing digital cameras, the matching processor 155 can select an advertisement for digital cameras. Additionally, the matching processor 155 can receive information from the geographical processor 159 to better determine which advertisements are likely to appeal to a user viewing a particular web page. For example, if the geographical processor 155 determines that the user 112a is from San Francisco, the matching processor 155 can display advertisements determined by the geographical processor 159 to be associated with San Francisco.

It should be noted that the present invention may comprise systems having different architecture than that which is shown in FIG. 1. For example, in some systems according to the present invention, server device 104 may comprise a single physical or logical server. The system 100 shown in FIG. 1 is merely exemplary, and is used to help explain the methods illustrated in FIGS. 2-4.

Various methods in accordance with the present invention may be carried out. One exemplary method according to the present invention comprises determining an article containing at least one item associated with selection data, determining a path associated with the article, and identifying at least one term associated with the at least one item based at least in part on the path. Another exemplary method comprises determining a geographical location associated with an article based at least in part on selection data associated with the article, determining geographical locations associated with at least some items within a plurality of items based at least in part on selection data associated with the at least some items, and selecting at least one of the plurality of items to be presented on the article based at least in part on the geographical location associated with the article and the geographical location associated with the item. Another exemplary embodiment according to the present invention comprises determining an article containing at least one item, determining selection data associated with the at least one item, and determining a likelihood that the article is a manipulated article based at least in part on the selection data associated with the at least one item.

Figure 2:
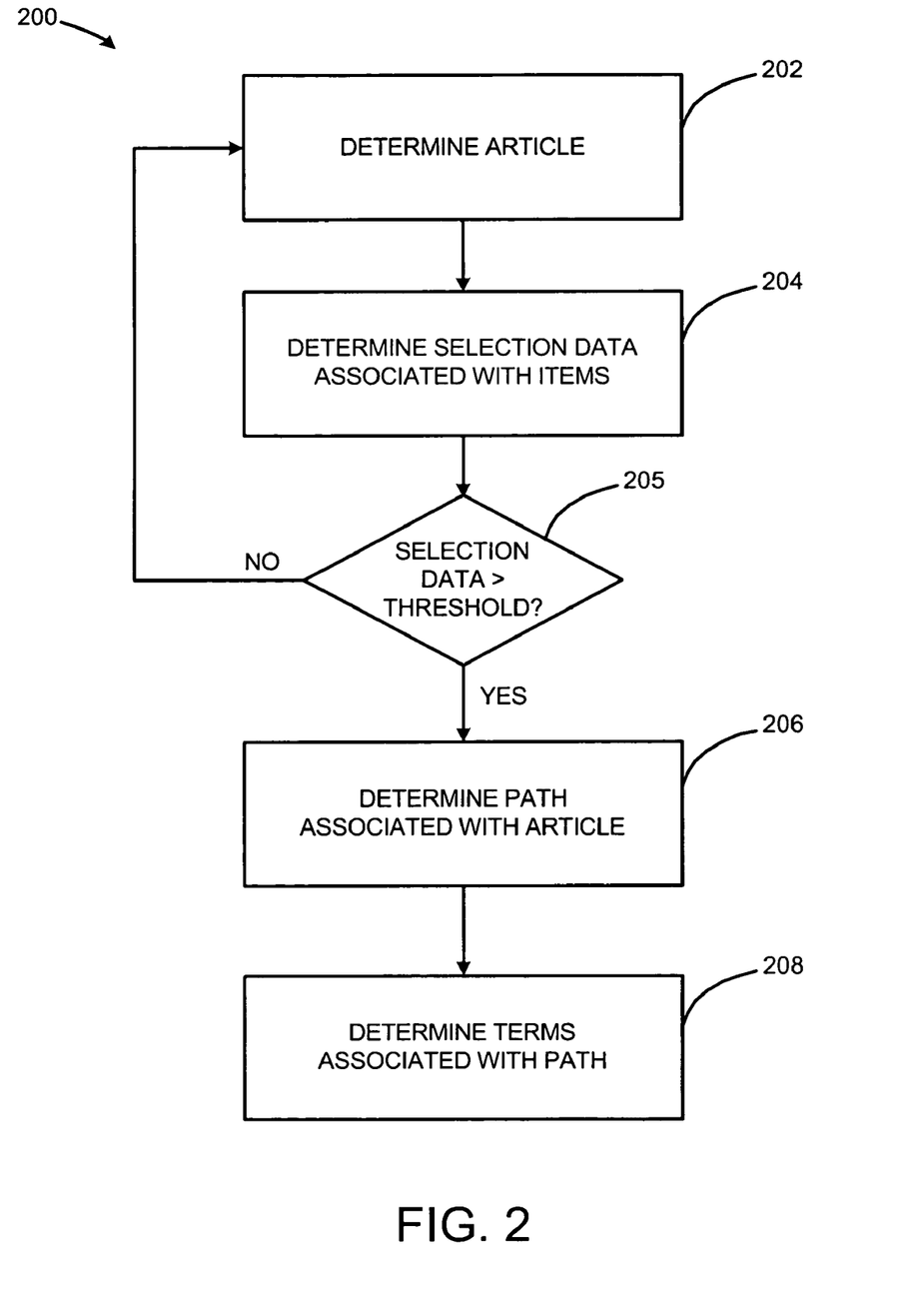
FIG. 2 illustrates a method in accordance with one embodiment of the present invention.
Figure 3:
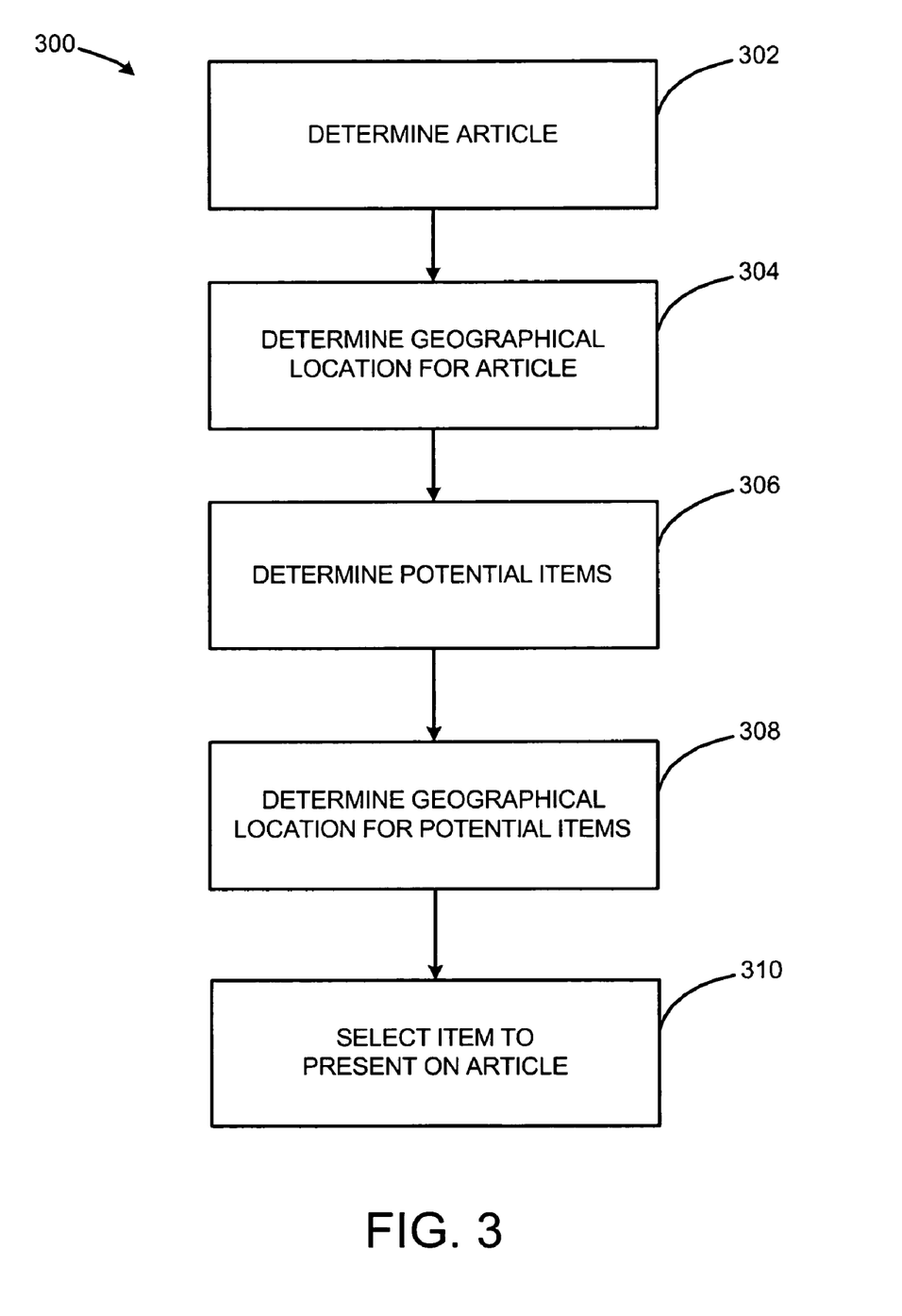
FIG. 3 illustrates another method in accordance with one embodiment of the present invention.
Figure 4:
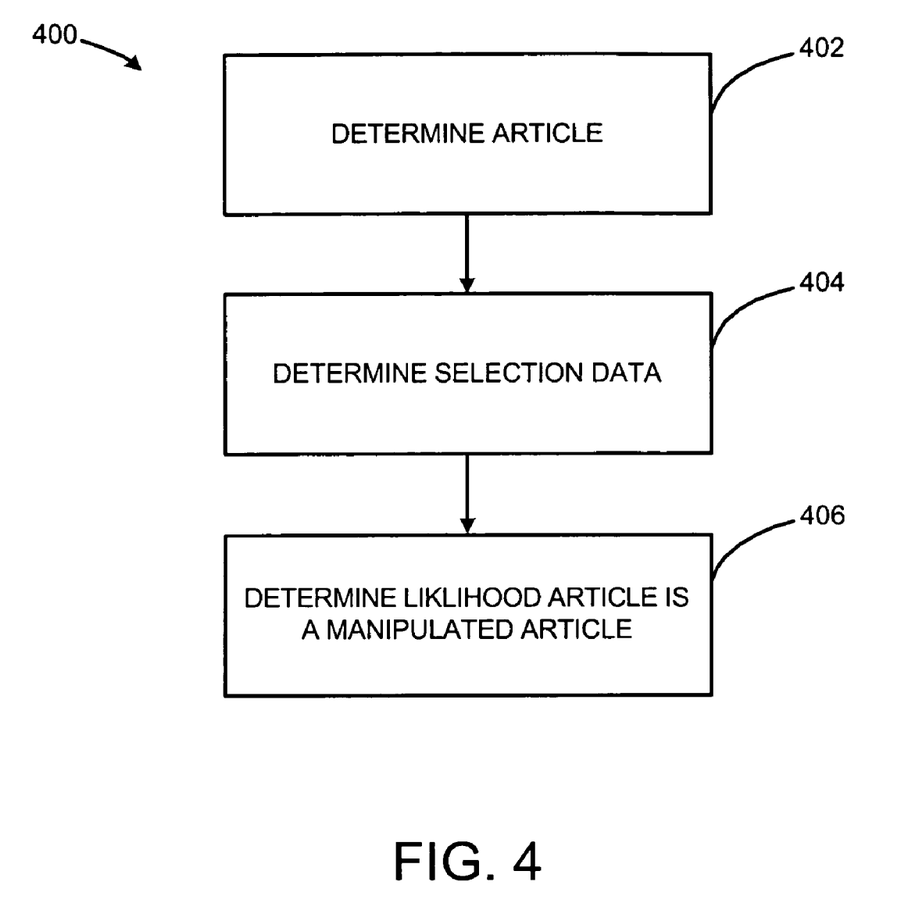
FIG. 4 illustrates another method in accordance with one embodiment of the present invention.

FIGS. 2-4 illustrate exemplary methods 200-400 in accordance with the present invention in detail. These exemplary methods are provided by way of example, as there are a variety of ways to carry out methods according to the present invention. The methods 200-400 shown in FIGS. 2-4 can be executed or otherwise performed by any of various systems. The methods 200-400 are described below as carried out by the system 100 shown in FIG. 1 by way of example, and various elements of the system 100 are referenced in explaining the example methods of FIGS. 2-4.

FIG. 2 illustrates a method 200 according to certain embodiments of the present invention. The method 200 shown in FIG. 2 provides a method for determining terms based at least in part on selection data. More specifically, the method 200 provides a method for determining terms contained in one or more articles associated with a product or service that can be used to expand a list of keywords used for advertising the product or service. According to the embodiment depicted in FIG. 2, the method 200 begins in block 202. In block 202, the document engine 146 determines an article requesting advertisements from the document server 140. For example, in block 202, the document engine 146 can determine that the article 130 on the network 106 is an article requesting advertisements, or other items, from the document engine 146. The article determined in block 202 can be associated with one or more advertisements or other items. For example, the article 130 can relate to digital cameras. The document engine 146 can cause the display of several advertisements relating to digital cameras on the article 130.

Once the document engine 146 determines an article, the method 200 proceeds to block 204, wherein the selection data processor 158 determines selection data associated with items included in the article. The selection data can include, for example, click-through data. The click-through data associated with items included in the article can reflect the frequency with which users viewing the article click on or select the item. The click-through data can be expressed as a percentage, for example, comprising a number of times a user clicks on or selects an item as a percentage of the number of times the item has been presented to the user. For example, the article determined in block 202 can be an article related to digital cameras and an item contained on the article can be a digital camera advertisement. The selection data processor 158 can determine, for example, the number of times a user has clicked on the digital camera advertisement contained on the article related to digital cameras. Additionally, the selection data processor can determine a click-though rate comprising the number of times the advertisement is selected as a percentage of the number of times it was viewed.

Once the selection data processor 157 determines selection data associated with the article determined in block 202, the method 200 proceeds to block 205 wherein the selection data processor 158 determines whether the selection data is greater than a certain threshold value. For example, the threshold value can be a percentage reflecting a number of times an item is selected compared to a number of times the item is presented. The threshold value can further reflect a cutoff value, such that selection data percentage below the cutoff value are not considered significant and selection data percentages above the cutoff are considered significant. For example, it can be determined that items with a click-through data lower than 10% do not generate significant user interest to merit further analysis. In block 205, if it is determined that the selection data is less than the threshold value, the method 200 returns to block 202 wherein another article is determined. If it is determined in block 205 that the selection data is greater than the threshold value, the method 200 proceeds to block 206.

In block 206, the path processor 156 determines a path associated with the article determined in block 202 by the document engine 146. The path associated with the article can comprise, for example, a sequence of web pages viewed by a user 112a in arriving at the article determined in block 202. For example, a user 112a can go to a search engine home page and enter one or more search terms. The user 112a can then view a search results web page containing a list of retrieved articles relevant to the search terms entered on the search engine home page. The user can select one of the results displayed on the search engine search results page and be taken to a first web page containing additional links. The user can then click on one of the additional links to go to a second web page. The path associated with the second web page can comprise the first web page, the search results web page displaying the list of retrieved articles, and the search engine home page containing the one or more search terms. Other examples of a path associated with an article can include, for example, an advertisement or other item selected from a listing of search results, an email containing a link leading a user to a particular article, a URL typed into a browser application leading a user to a particular article, or any other sequence of articles or events leading a user 112a to a particular article.

Once the path processor 156 determines a path associated with the article, the method 200 proceeds to block 208. In block 208, the term processor 157 determines terms associated with the path determined in block 206. The terms associated with the path can comprise, for example, text of advertisements leading a user 112a to an article, keywords associated with advertisements with the path, search terms entered into a search engine home page initiating a path followed by a user in arriving at an article, terms within a link followed by a user in arriving at an article, or any other term associated with the path followed by a user in arriving at a particular article. The terms determined by the term processor 157 to be associated with the path leading to an article can be used to identify terms associated with a concept, idea or product associated with the article. For example, a user 112a can enter a search term "health" on a search engine home page. The search engine can then display a list of results associated with the search term "health" along with advertisements associated with "health." The user 112a can click on one of the advertisements displayed with the list of results and be taken to a web page containing additional advertisements advertising, for example, "prescription drugs." The user 112a can then click on an advertisement and be taken to a web site selling, for example, prescription drugs. The path processor 156 can determine a path comprising the sequence of pages viewed by the user 112a in moving from the search engine home page to the web site selling prescription drugs. The term processor 157 can determine terms associated with the path, for example, the term "health" entered as a search term, and can associate this term with the product "prescription drugs."

The terms identified as being associated with a concept, product, or idea associated with the path can be used to broaden or establish advertising terms for the concept, product or idea. For example, the term "health" determined in the example above can be included in a list of keywords for prescription drugs. The list of keywords can, for example, then be presented to those interested in promoting a product or service, so that additional, and sometimes less obvious, terms can be suggested for promoting the product or service.

FIG. 3 illustrates a method 300 according to certain embodiments of the present invention. The method 300 shown in FIG. 3 provides a method for matching items with an article based at least in part on selection data. For example, the method 300 can match a particular advertisement with a web page requesting an advertisement based in part on click-through data that indicates a geographical area of users who commonly select a particular advertisement. Thus, if click-through data for the particular advertisement shows that users from California commonly click on the advertisement, and that users commonly visiting the web page are from California, the method 300 can match the particular advertisement with the web page.

According to the embodiment depicted in FIG. 3, the method 300 begins in block 302 wherein the document engine 146 determines an article requesting advertisements from the document engine 146 similar to the process described in block 202 of FIG. 2. Once the document engine 146 determines an article, the method 300 proceeds to block 304 wherein geographical processor determines a geographical location associated with the article based at least in part on selection data associated with the article. The geographical location associated with the article can indicate a geographical area associated with users demonstrating a preference for the article. The geographical processor 159 can determine a geographical area associated with users demonstrating a preference for the article by determining a geographical location of an IP address associated with each user selecting the article, for example, by clicking on a link within a list of search results. Thus, for example, if a majority of users selecting a link to a certain article from a list of search results have IP addresses located in San Francisco, the geographical processor 159 can associate the certain article with a geographical location San Francisco.

Once the geographical processor 159 determines a geographical area associated with the article, the method 300 proceeds to block 306 wherein the matching processor 155 determines a set of potential items for display on the article. The set of potential items can include, for example, advertisements associated with keywords associated with the article. For example, if the article relates to digital cameras, the set of items can include all advertisements for digital cameras. The set of advertisements the matching processor determines in block 306 can potentially be large if, for example, the article is associated with many different keywords.

Once the matching processor determines a set of potential items for display, the method 300 proceeds to block 308, wherein the geographical data processor 159 determines a geographical location associated with each of the items within the set of potential items based at least in part on the selection data associated with the potential items. During block 308, the geographical data processor can access previously determined geographical location data stored in the data store 148 or other source, or can determine a geographical location based on selection data received from the selection data processor 158. The selection data can include, for example, click-through data indicating the geographical location of IP addresses for users selecting a particular item. For example, if users from California frequently select an advertisement for a certain brand of digital camera, the advertisement for the certain brand of digital camera can be associated with California.

Once the geographical processor 159 determines a geographical location associated with an item, the method 300 proceeds to block 310 wherein the matching processor 155 determines an item to display, based at least in part on the geographical location associated with an item, on the article determined by the document processor 156 in block 302. The matching processor 155 receives from the geographical processor 159 the geographical location associated with the article and the geographical location associated with the potential items to be displayed on the article. The matching processor 155 may further receive from the geographical processor 159 a geographical location associated with a current user. The geographical location associated with a current user can reflect, for example, the location of the IP address of a user accessing the article determined in block 202. The matching processor can then determine an item based at least in part on matching the geographical location associated with the potential items to display on the article with the geographical location associated with the article. For example, if the article determined in block 302 is associated with a geographical location England, and one of the items within a plurality of potential items is also associated with the geographical location England, the matching processor 155 can use this information to select the item associated with England for display on the article. Additionally, the matching processor 155 can select items for display on an article based on the IP address of a current user. For example, if the IP address of the current user is associated with California, advertisements within the set of items determined in block 306 that are also associated with California can be selected by the matching processor 155 for display on the article. In this manner the matching processor 155 can better target a particular user with advertisements more likely to appeal to the particular user.

FIG. 4 illustrates a method 400 in accordance with certain embodiments of the present invention. The method 400 provides a method for determining manipulated articles based in part on selection data associated with one or more items contained within an article. For example, the method 400 can identify web pages containing advertisements with very high click-through rates that likely contain no information content. According to the embodiment depicted in FIG. 4, the method 400 begins in block 402 wherein the document engine 146 determines an article among a set of articles requesting advertisements from the document engine 146. The document engine 146 can crawl, for example, the set of articles requesting advertisements from the document engine 146 and determine articles with which items have been associated. For example, the document engine 146 can crawl web pages requesting advertisements and select those web pages that have been presented to users along with advertisements.

Once the document engine 146 determines an article, the method 400 proceeds to block 404 wherein selection data, such as a click-through data associated with an item associated with the article is determined. The item associated with the article can include, for example, advertisements that the document engine 146 caused to be displayed on the article. The click-through data for the item can correspond to a number of times a user clicks on the item in order to move from the article containing the item to another article. For example, the article can comprise a web page containing an advertisement. A user may click on the advertisement in order to move from the web page to another web page selling a product associated with the advertisement. The selection data processor 158 can determine the click-through data for the advertisement on the web page by determining the number of times a user selects the advertisement as compared to the number of times the advertisement is presented to the user.

Once the selection data processor 158 determines selection data associated with items included in the article, the method 400 proceeds to block 406. In block 406 the document engine 146 determines a likelihood that the article determined in block 402 is a manipulated article based at least in part on the selection data associated with items within the article in block 404. The document engine 146 can determine a likelihood of an article being a manipulated article by receiving from the click-through processor 158 the click-through data associated with articles. Articles associated with relatively high click-through rates can be more likely to have little informational content and are thus more likely to be manipulated articles. For example, a manipulated article, such as a web page, will often contain many key terms and automatically create links from other web pages that will cause the article to rank highly in a list of search results. The web page may further contain content designed to generate content ads associated with the key terms on the web page, but provide no real substantive information. If a user selects the web page from a listing of search results associated with the key terms and views the web page, the user may quickly realize that there are only key terms and no real substantive informational content on the web page. The user may then see the content advertisements displayed on the web page, and in seeking additional information about the topic reflected by the key terms, may select one of the advertisements. On the other hand, a web page with high informational content may also be displayed high in a listing of search results. The web page containing high information content may also contain content advertisements. However, when a user views the page containing high informational content, the user is less likely to move from the page to an advertisement if the page itself contains the information the user is seeking. Therefore, the document engine 146 can determine a likelihood that articles are manipulated articles containing little informational content by receiving from the click-through processor 158 click-through rates associated with items contained in the articles, and further determining whether the click-through rates reflect relatively high click-through rates.

The document engine 146 can determine whether the click-through data associated with an article is a high click-through data by comparing the click-through rate, for example, to a threshold click-through rate. The threshold click-through data can be expressed, for example, as a percentage of times a user clicks through or selects an item versus how many times the item is viewed by a user. If the click-through data received for an article by the document engine 146 from the click-through processor 158 is above the threshold click-through rate, then the document engine 146 can determine that the article is a manipulated article.

Once the document engine 146 determines the likelihood that an article is a manipulated article, the method 400 ends. The likelihood that an article is a manipulated article can be used in a variety of ways. For example, the information that an article is likely a manipulated article can be used to lower a ranking associated with that article such that the article will be displayed lower in a listing of search results or not displayed at all. Alternatively, the information that an article is likely a manipulated article can be used to test ranking algorithms. For example, it may be desirable to use ranking algorithms that function independently of the click-through data associated with an article, but that nevertheless attempt to lower manipulated articles within a listing of search results. The information obtained from the method 400 that an article is likely to be a manipulated article based on the click-through data can be used to test the effectiveness of a ranking algorithm that functions independently of the click-through rate. For example, if the method 400 determines that articles A, B and C are associated with high click-through rates and therefore are likely to be manipulated articles, this information can be compared to the ranking determined by an algorithm independent of the click-through data associated with the articles for the articles A, B and C. If the articles A, B and C are similarly ranked lowly by an algorithm independent of the click-through rate, this can be an indication that the independent algorithm effectively identifies manipulated articles.

Figure 5:
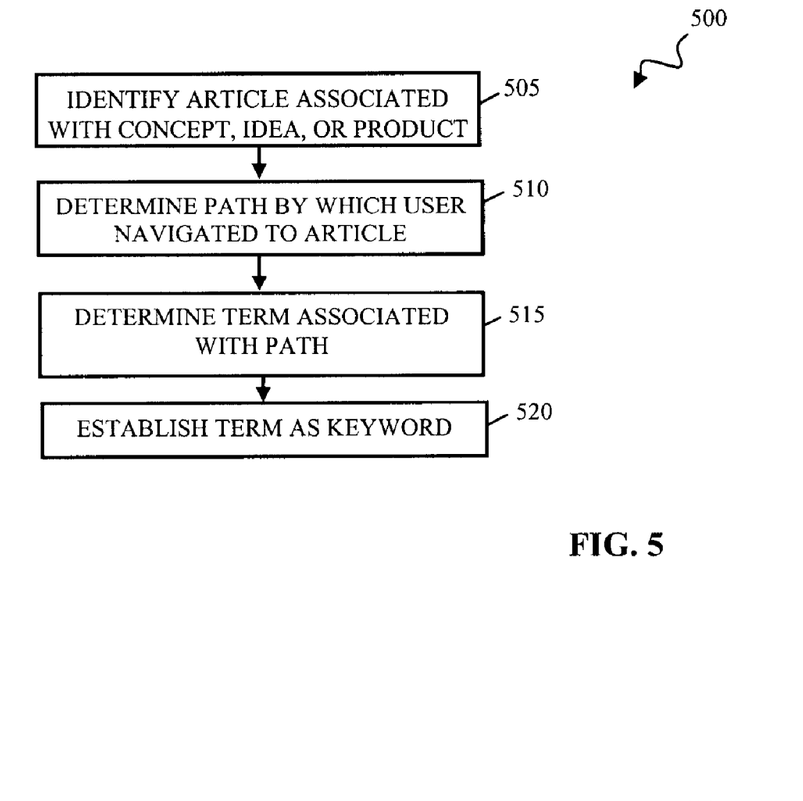
FIGS. 5 and 6 illustrate other methods in accordance with one embodiment of the present invention.

FIG. 5 illustrates a method 500 in accordance with one embodiment of the present invention. Method 500 includes identifying an article that is associated with a concept, idea, or product 505, determining a path by which a user navigated to the article 510, determining a term that is associated with the path by which the user navigated to the article 515, and establishing the term as a keyword designating the concept, idea, or product based at least in part on the determination that the term is associated with the path 520.

Figure 6:
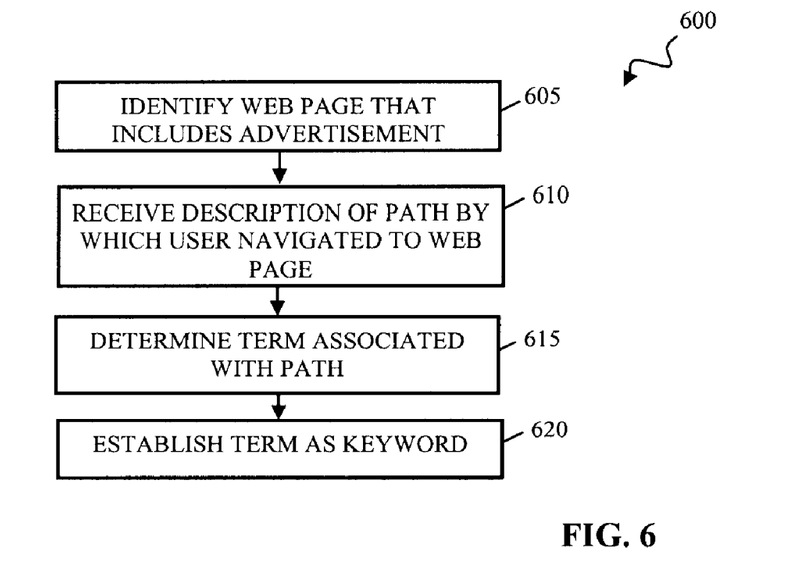

FIG. 6 illustrates a method 600 in accordance with one embodiment of the present invention. Method 600 includes identifying a web page that includes an advertisement regarding a product or a service 605, wherein the advertisement is to be displayed on the web page, receiving a description of a path by which a user has navigated to the web page 610, determining a term that is associated with the path by which the user navigated to the web page 615, and establishing the term as a keyword for promotion of the product or the service 620.

While the above description contains many specifics, these specifics should not be construed as limitations on the scope of the invention, but merely as exemplifications of the disclosed embodiments. Those skilled in the art will envision any other possible variations that are within the scope of the invention.

That which is claimed:

1. One or more computer-readable storage devices comprising program code operable to cause one or more machines to perform operations, the operations comprising:
   identifying an article stored in a computer readable memory at a first server on a data communication network;
   determining a path by which a user navigated to the article and displayed the article including an advertisement advertising a product or a service on an output device of a client that is on the data communication network, wherein the path includes at least one of
      an item presented to the user over the output device of the client,
      a second article presented to the user over the output device of the client, and
      text received from the user over an input device of the client;
   after determining the path by which the user navigated to and displayed the article, determining a term that is associated with the path by which the user navigated to the article; and
   after determining that the term is associated with the path, establishing a keyword based on the term, the thus established keyword designating the product or the service advertised by the advertisement based at least in part on the determination that the term is associated with the path.

2. The one or more computer-readable storage devices of claim 1, wherein the article comprises a web page.

3. The one or more computer-readable storage devices of claim 1, wherein the path comprises a series of web pages by which the user navigated to the article.

4. The one or more computer-readable storage devices of claim 1, wherein the term comprises text associated with an advertisement by which the user navigated to the article.

5. The one or more computer-readable storage devices of claim 1, wherein the term comprises a keyword that is associated with an advertisement.

6. The one or more computer-readable storage devices of claim 1, wherein the term comprises text of a search term entered into a search engine.

7. One or more computer-readable storage devices comprising program code operable to cause one or more machines to perform operations, the operations comprising:
   identifying a web page that is stored in a computer readable memory at a first server on a data communication network;
   receiving a description of a path by which a user has navigated to the web page and has displayed the web page including an advertisement advertising a product or a service on an output device of a client on the data communication network, wherein the description of the path characterizes at least one of an item presented to the user over the output device of the client, an article presented to the user over the output device of the client, and text received from the user over an input device of the client;

after receiving the description of the path by which a user has navigated to and has displayed the web page, determining a term that is associated with the path by which the user navigated to the web page, wherein the term is determined by a term processor of an application program at a second server on the data communication network; and after determining the term that is associated with the path, establishing a keyword based on the term, the thus established keyword designating the product or the service advertised by the advertisement based at least in part on the determination that the term is associated with the path.

8. The one or more computer-readable storage devices of claim 7, wherein determining the term that is associated with the path comprises determining the term from text of a second advertisement by which the user navigated to the web page.

9. The one or more computer-readable storage devices of claim 7, wherein determining the term that is associated with the path comprises determining a keyword that is associated with a second advertisement on a second webpage in the path.

10. The one or more computer-readable storage devices of claim 7, wherein determining the term that is associated with the path comprises determining a search term entered into a search engine by the user in navigating to the webpage.

11. The one or more computer-readable storage devices of claim 7, wherein determining the term that is associated with the path comprises determining a term within a link that was followed by the user in navigating to the web page.

12. The one or more computer-readable storage devices of claim 7, wherein establishing the keyword for promotion of the product or the service comprises presenting the keyword to a party who promotes the product or the service.

13. The one or more computer-readable storage devices of claim 7, wherein establishing the keyword comprises including the term in a list of keywords for the product or the service.

14. The one or more computer-readable storage devices of claim 7, wherein establishing the keyword comprises expanding a list of keywords designating the product or the service with an additional term.

15. The one or more computer-readable storage devices of claim 14, wherein the operations further comprise presenting the list of keywords as suggestions for promoting the product or the service.

16. The one or more computer-readable storage devices of claim 1, wherein establishing the keyword comprises expanding a list of keywords designating the product with an additional term.

17. The one or more computer-readable storage devices of claim 16, wherein the operations further comprise presenting the list of keywords as suggestions for promoting the product or the service.

18. The one or more computer-readable storage devices of claim 1, wherein the operations further comprise:
matching content of a web page to the keyword; and
displaying a second advertisement matched to the keyword on the web page.

19. The one or more computer-readable storage devices of claim 7, wherein the operations further comprise:
matching content of a second web-page to the keyword; and
displaying a second advertisement promoting the product or the service on the second web page.

20. The one or more computer-readable storage devices of claim 1, wherein the operations further comprise receiving an advertiser's bid to have a second advertisement displayed with a list of search results related to the keyword.

21. The one or more computer-readable storage devices of claim 1, wherein the operations further comprise receiving an advertiser's bid to have a second advertisement displayed with a list of search results related to the keyword.

22. The one or more computer-readable storage devices of claim 1, wherein determining the path by which the user navigated to the article comprises determining an email containing a link leading to a particular article.

23. The one or more computer-readable storage devices of claim 7, wherein description of the path describes an email containing a link leading to a particular article.

* * * * *